Aug. 30, 1949.  W. C. LAZARUS ET AL  2,480,145
AERIAL HOOKUP FOR TOWING AIRPLANES
Filed Aug. 12, 1946  2 Sheets-Sheet 1
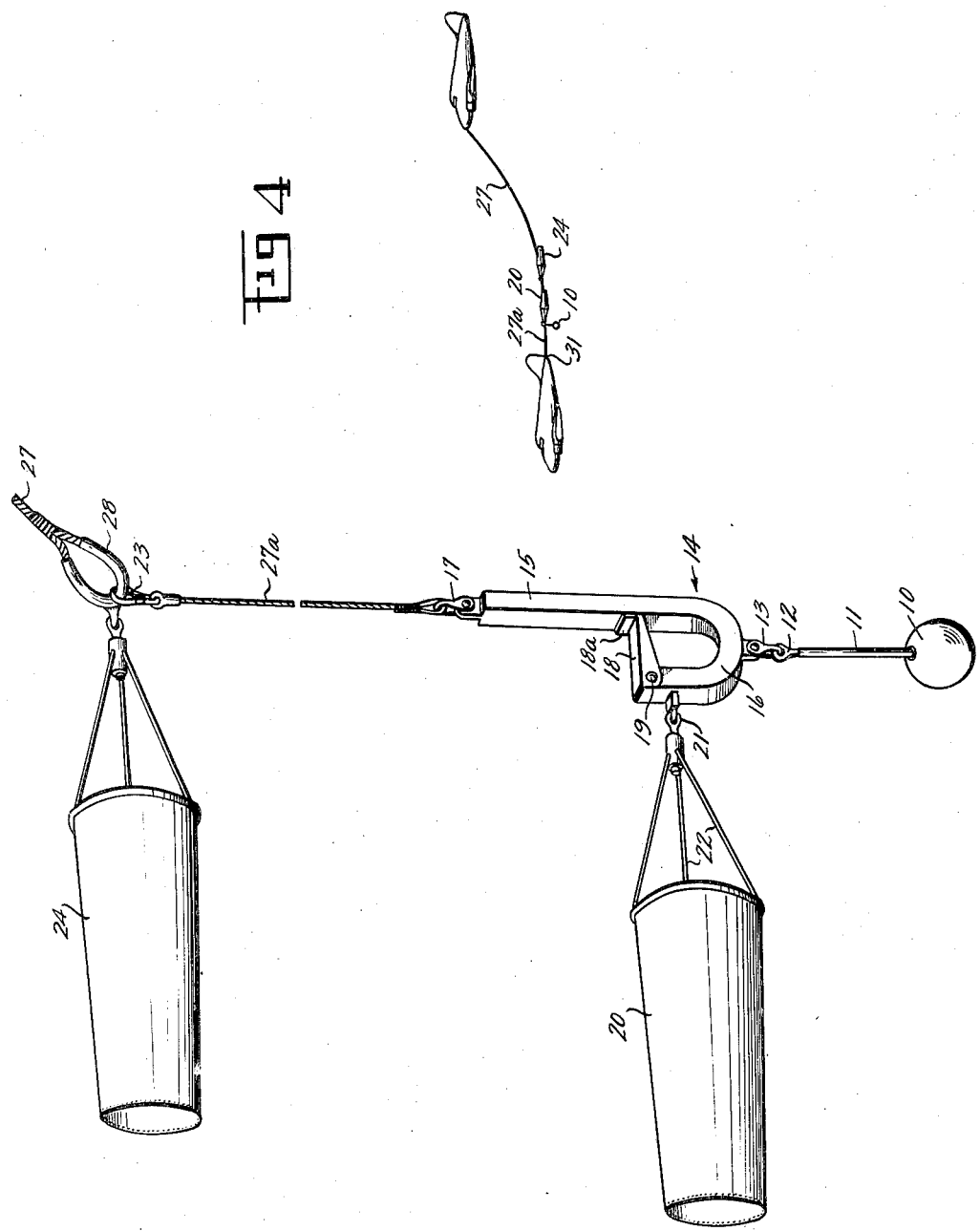
INVENTORS.
WILLIAM C. LAZARUS.
ROBERT H. PAUL
JAMES B. RISHEL
BY
*Wade Loouty*
*Chester Tietig*
ATTORNEYS Aug. 30, 1949. W. C. LAZARUS ET AL 2,480,145
AERIAL HOOKUP FOR TOWING AIRPLANES
Filed Aug. 12, 1946 2 Sheets-Sheet 2
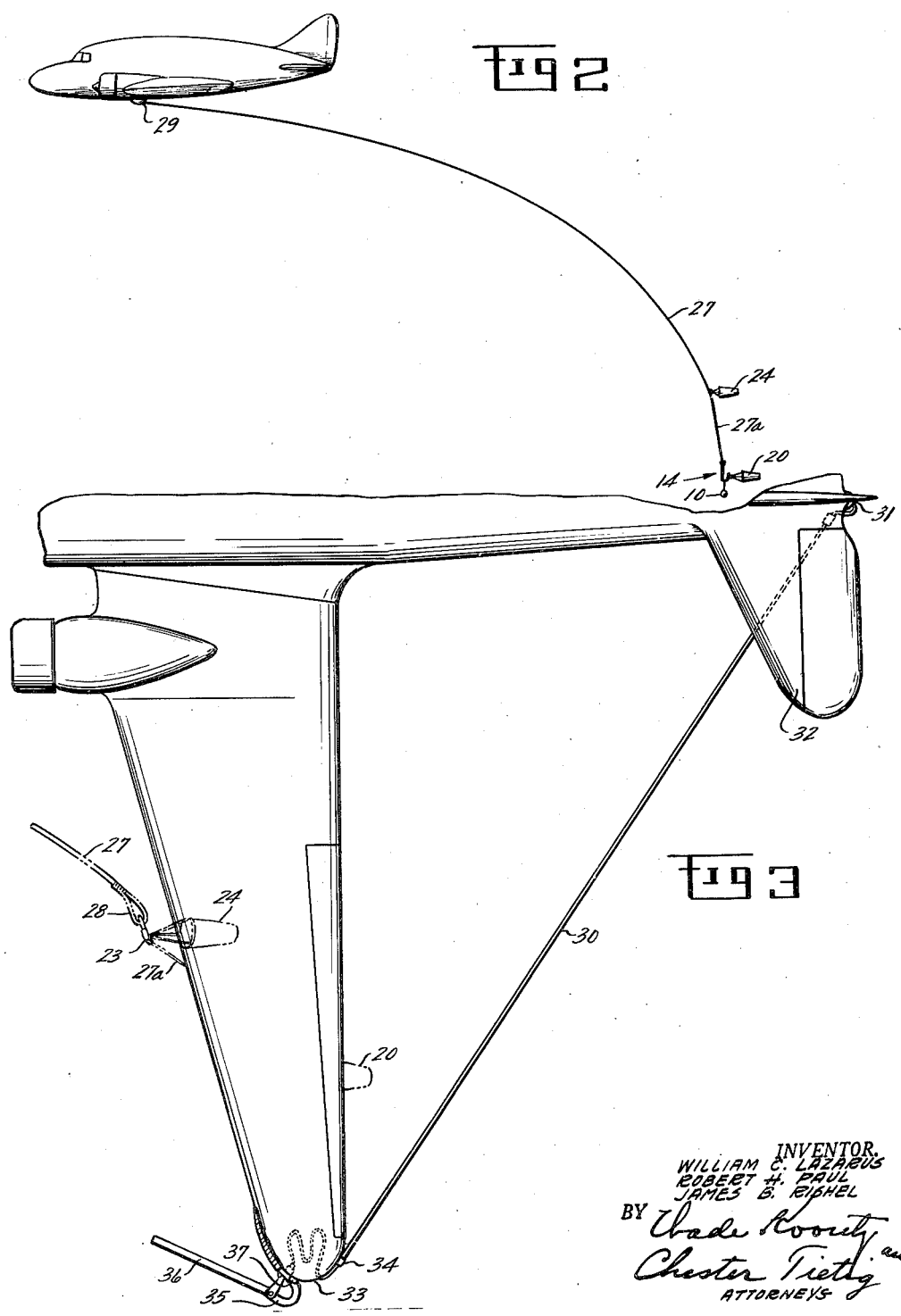
INVENTOR.
WILLIAM C. LAZARUS
ROBERT H. PAUL
JAMES B. RISHEL
BY
Chester Tietig and
ATTORNEYS

UNITED STATES PATENT OFFICE 2,480,145

AERIAL HOOKUP FOR TOWING AIRPLANES

William C. Lazarus, Orlando, Fla., Robert H. Paul, Inglewood, Calif., and James B. Rishel, Dayton, Ohio Application August 12, 1946, Serial No. 689,850

5 Claims. (Cl. 244—3)

(Granted under the act of March 3, 1883, as amended April 30, 1928; 370 O. G. 757)

The invention described herein may be manufactured and used by or for the Government for governmental purposes without payment to us of any royalty thereon.

This invention relates to a device by which a partially disabled airplane, i. e., one which still can maintain itself aloft, can be engaged and towed by a second airplane.

Among the objects of this invention are the provision of means that is safe, particularly during engagement. Other objects are to furnish a statically and dynamically stabilized positive hook on the end of a line extending from the damaged aircraft; also by means of two socks (drogues), to create a vertical or nearly vertical section of trailing cable which forms a definite pick-up station. Still another object is to provide a positive connection into which the hook snaps upon contact, thereby making a link-chain connection rather than the "needle threaded with knot" type of connection common in the prior art.

Definite advantages of this device are the absence of grapnels; the elimination of the necessity for intersecting two cables in mid-air or for intersecting the airplane courses. Positive advantages are the presence of both a weight and socks for stabilizing the trailed cable. Cables without weights whip uncontrollably and can cut a wing from another aircraft while those with only a weight and no socks cannot be safely approached by another aircraft.

In the drawings, Fig. 1 is a perspective view of the socks, the hook, the weight and a portion of the cable. Fig. 2 is a side elevation of the distressed airplane dangling the apparatus shown in Fig. 1 in position for the rescuing airplane to engage it.

Fig. 3 is a plan view of the towing airplane showing the mounting of the engaging device and hawser upon one wing thereof.

Fig. 4 is a side view showing the completed engagement, i. e., one plane towing the other.

Referring now to Fig. 1, 10 is a metal ball, preferably of brass and of about five inches diameter. A stem 11 is provided with a pivoted eye 12 which interlocks with a second pivoted eye 13 which is attached to the lower surface of the bend of a large hook 14. The shank 15 of hook 14 is about twice as long as the bend 16 although such proportion is not critical. An eye 17 is pivoted to the end of shank 15. The general proportions are therefore of a long-shanked fish-hook.

In the place where there would be a barb on an ordinary fish-hook, there is provided a snap 18 pivoted at 19. A lug 18a, welded to shank 15, permits the snap to yield inwardly toward the bend, but not to open outwardly. Also pivoted to the hook at the place where the barb of a fish-hook would be found, there is a windsock or drogue 20 attached by pivot 21 by means of a plurality of rods 22 which terminate into the ring of the windsock 20.

To eye 17 there is attached a cable 27a which may be of about ¼" diameter and about 18 feet long. The dimensions are not critical. To the end furthest from the hook 14 there is a second snap hook or openable link 23 to which is attached a sock 24. The hook or link 23 engages an eye 26 of a nylon hawser 27. The eye 26 is protected by a V-shaped length of metal tubing 28. The hawser may be about one inch diameter and say 250 feet long.

The upper end of hawser 27 is attached by a conventional tow release mechanism 29 to the belly of the distressed plane.

Referring now to Fig. 3, a cable 30 is attached by a conventional tow release mechanism 31 to the tail of the fuselage. The cable passes under the elevator 32, to the wing tip 33 where it is retained by means of a bracket 34 which is safety-wired to the wing tip. It is also retained by being taped with adhesive tape to the wing surface. On the cable's end there is a snatch hook 35 which has a guiding portion 36 which projects outward for about two feet at about 30° angle. Other angles or dimensions may be employed.

The snatch hook 35 is quite similar to hook 14 except that in place of a straight shank, it has a bent guiding portion 36 which makes an acute angle with the shank axis and is not equipped with pivots for a windsock. The angle at which the guiding portion assumes in relation to the plane wing is about 30° negative, i. e., it points toward the tip of the fuselage or ahead of this point. In order to hold the hook to the wing tip, a permanently installed bracket 37 may be attached to the wing tip and the hook 35 taped to it by its shank.

The device is used as follows: The plane to be towed operated conventional tow release mechanism 29, thereby dropping weight 10 and associated parts. Hawser 27 streams out behind the plane, but cable 27a assumes a nearly vertical position which is stabilized by the windsocks. The towing plane now approaches from behind and at a lower level than the plane to be towed and places the leading edge of whichever wing bears hook 35 in contact with cable 27a. Generally the left wing is preferred. The airspeed of the towing plane should be 5 M. P. H. faster than the towed plane. Consequently cable 27a bends over the leading edge, the upper windsock coming to rest usually on the top of the wing. A gradual slippage or peeling toward the wing tip then occurs which may be aided by the pilot of the towing plane. Cable 27a engages guiding portion 36 and forces open the latch of snap hook 35. As the towing plane begins to assume towing load, the tape holding hook 35 to the wing tip is torn loose. Hook 35 consequently falls and the slack in hawsers 27, 27a and 30 is taken up until the two hooks, 35 and 14, are pulled into engagement. Full towing load is then assumed, the stretch of nylon hawsers 27, taking up a considerable amount of the shock.

At the start of the maneuver, the towing plane should be about 100 feet below the one to be towed, but as the connection is made it may rise slightly. The towed plane is preferably higher than the towing one thruout the course to the base.

From the foregoing, it is evident that a method of using the device has also been invented, since the desired results are not inevitable unless the method is followed with some degree of fidelity.

The invention claimed is:

1. In combination, an airplane to be towed, a long elastic hawser dangling therefrom, an aerodynamically stabilized, weighted cable at the end of said hawser, a towing airplane having a leading wing edge adapted to engage said cable by said edge, a receiving snap hook upon an outer extremity of said edge, said hook being adapted and positioned to catch and hold said weighted cable, an easily separable holding means binding said hook to said edge extremity in a position to receive said weighted cable and an elastic hawser connecting said receiving hook to a towing point on said airplane whereby when said weighted cable is caught and held by said receiving snap hook, a tow connection will be established between the airplanes.

2. In combination, a long elastic hawser, a substantial length of cable attached to one end thereof, a snap hook attached to the free end of said cable, a weight revolubly attached to said hook and a windsock revolubly attached to said hook and a second windsock revolubly attached to said cable substantially at the point where it joins the hawser.

3. In combination, an elastic hawser, an airborne anchorage for one end thereof, a snap hook having a guiding section to guide a taut hawser into engagement with said hook, said hook being attached to the free end of said hawser and an easily rupturable means attaching said hook to an airborne wing tip belonging to the same aircraft as the said anchorage.

4. A snap hook which comprises a shank, a pivoted eye on the extremity of said shank, a bend, a pivoted eye mounted at the bottom outer portion of said bend, a weight attached to said pivoted eye, a bent over portion, a pivoted snap attached to substantially the outer end thereof, a lug on said shank holding said snap portion from swinging outward and a windsock revolubly attached to the outer surface of the bent over portion substantially at the outer end thereof.

5. A snap hook comprising a shank, a bend, a bent over portion, a snap between said bent over portion and shank and a hawser guiding portion of substantial length substantially integral with said shank, said guiding portion making an acute angle outwardly with the longitudinal axis of said shank.

WILLIAM C. LAZARUS.
ROBERT H. PAUL.
JAMES B. RISHEL.

REFERENCES CITED

The following references are of record in the file of this patent:

UNITED STATES PATENTS

| Number | Name | Date |
| --- | --- | --- |
| 1,848,372 | Moran | Mar. 8, 1932 |
| 1,925,555 | Bradshaw | Sept. 5, 1933 |
| 2,166,575 | Atcherley | July 18, 1939 |
| 2,261,598 | Tyson | Nov. 4, 1941 |
| 2,388,013 | Rasor | Oct. 30, 1945 |
| 2,396,071 | Anderson et al. | Mar. 5, 1946 |
| 2,418,702 | DuPont | Apr. 8, 1947 |